MAGNETIC MEMORY CIRCUITS

Filed Dec. 5, 1960 4 Sheets-Sheet 1

INVENTOR
A. H. BOBECK
BY William H. Kamstra
ATTORNEY

INVENTOR
A. H. BOBECK
BY William H. Kamstra
ATTORNEY

INVENTOR
A. H. BOBECK
BY William H. Kamstra
ATTORNEY

Jan. 5, 1965 A. H. BOBECK 3,164,812

MAGNETIC MEMORY CIRCUITS

Filed Dec. 5, 1960 4 Sheets-Sheet 4

INVENTOR
A. H. BOBECK
BY William H. Kamstra
ATTORNEY 3,164,812
Patented Jan. 5, 1965

3,164,812

MAGNETIC MEMORY CIRCUITS

Andrew H. Bobeck, Chatham, N.J., assignor to Bell Telephone Laboratories, Incorporated, New York, N.Y., a corporation of New York Filed Dec. 5, 1960, Ser. No. 73,669
22 Claims. (Cl. 340—174)

This invention relates to magnetic memory circuits and more particularly to such circuits employing magnetic elements capable of storing a plurality of information bits.

It is well known that magnetic cores, which may conveniently be of a toroidal shape, having rectangular hysteresis loops can be used to store binary values by being magnetized in either of two remanent flux states. One binary value is associated with one of the remanent states and the other binary value with the other of the remanent states. Which of the binary values is stored in the core at any gven time is determined by applying a read-out current pulse to a winding inductively coupled to the core. Should a reversal of the magnetic flux from one of its remanent states to the other remanent state occur as a result of the read-out current pulse, a voltage will be induced across a sense winding also inductively coupled to the core, which voltage will be indicative of a particular binary value. Only one binary information value is thus stored in each core and a number of toroidal cores equal to the total number of binary information values to be stored must be provided.

Accordingly, one object of this invention is to provide a single magnetic element capable of storing a plurality of binary information values, thereby simplifying the assembly and production of magnetic memory arrays.

It is another object of this invention to store binary information bits by means of a new and novel memory element.

It is a further object of this invention to provide a novel word-organized memory array in which each word is manifested in the form of binary information values stored in a single magnetic memory element.

It is a still further object of this invention to provide a novel magnetic memory element in which the character of the two binary information values stored in a bit address is indicated by one or the other polarity of signals appearing on output windings associated with respective ones of the bit addresses.

It is a still further object of this invention to provide a novel magnetic memory element whose operation is not dependent upon use of a material having a substantially rectangular hysteresis loop but merely upon the ability of the material to assume stable remanent states.

The above and other objects are realized in one embodiment according to the principles of this invention comprising a toroidal magnetic core having a plurality of apertures therein separating two distinct concentric flux paths in the core. Remanent magnetizations in the same direction are initially set up in both flux paths by a read out signal of one polarity upon a word winding inductively coupled to both paths. Information is subsequently written into the core by the application of a write signal of an opposite polarity to the word winding simultaneously with the application of information input signals to each of a plurality of input windings threading respective ones of the apertures and inductively coupled to only one of the flux paths. In the vicinity of each aperture a flux reversal occurs in only one of the flux paths dependent upon the polarity of the signal applied to the input winding threading that aperture. The flux so reversed then determines the binary information value stored about the particular aperture. Readout is accompanied by the application of another read out signal to the word winding thereby causing signals to be induced in output windings also threading respective ones of the apertures and inductively coupled to only one of the flux paths. The presence or absence of an output signal in a particular output winding during the read-out phase of operation is thus indicative of the particular binary information stored about the aperture associated with that winding. A number of these cores may be stacked to form a matrix arrangement in which the input and output windings thread corresponding apertures of the several cores.

According to another embodiment of this invention, the output windings are inductively coupled to both of the flux paths. There will then be a signal induced in an output winding during the read-out phase of operation, regardless of which flux path undergoes a flux reversal. The polarity of the signal induced in a particular output winding is indicative of the partcular binary value stored about its associated aperture. Harmful effects of shuttle signals caused by the flux in one of the paths being driven from a remanent magnetic condition in one direction to a saturated condition in the same direction are eliminated since these shuttle signals merely diminish somewhat the larger opposite polarity signals resulting from the flux in the other path being driven from a remanent magnetic condition in one direction to a saturated condition in the other direction. Therefore, in this embodiment, the rectangularity of the hysteresis loop of the core material is not a requisite to its operation. It is only necessary that the core be of a material capable of assuming two stable remanent states.

According to a further embodiment of this invention, a plurality of binary information values are stored about a plurality of apertures in a closed loop of magnetic tape. These apertures likewise define two distinct flux paths in the closed loop of tape; however, in this embodiment the apertures are arranged so that each aperture on one side of the loop is associated with an aperture on the other side of the loop. Remanent magnetizations in the same direction are likewise set up initially by a read-out signal of one polarity appearing on a word winding inductively coupled to both paths. Information is written into the element by the application of a write signal of a polarity opposite to that used for reading to the word winding simultaneously with the application of information input signals to each of a plurality of input windings, each of which threads corresponding apertures on the two sides of the loop. In the vicinity of each aperture a flux reversal occurs in only one of the flux paths dependent upon the polarity of the signal applied to the input winding threading that aperture. For each of corresponding apertures, one will experience a flux reversal in one of the flux paths and the other will experience a flux reversal in the other flux path. The particular binary information value stored about a particular pair of apertures is determined by the particular flux condition about each aperture. Readout is accomplished by the application of another read-out signal to the word winding thereby causing signals to be induced in output windings also threading respective pairs of the apertures and inductively coupled to only one of the flux paths. The polarity of the output signal induced in a particular one of the output windings is indicative of the binary information value stored about the pair of apertures associated with that winding. Since shuttle signals occurring during the output phase of operation merely diminish somewhat the magnitude of the output signals, operation of the circuit is not dependent upon the use of a material having a substantially rectangular hysteresis loop but merely upon the ability of the tape material to assume stable remanent states.

Thus according to one feature of this invention, a magnetic element has a plurality of apertures therein each defining an information bit address, the apertures defining two distinct flux paths in the element linking each of the information bit addresses.

According to another feature of this invention, a word winding is inductively coupled to both flux paths established in the magnetic element.

It is another feature of this invention that a plurality of magnetic elements, each having a plurality of apertures establishing two distinct flux paths therein, be stacked together to form a word-organized memory array in which each binary word is stored in a single one of the magnetic elements.

According to a feature of one embodiment of this invention, input and output windings are inductively coupled to only one of two flux paths established in a magnetic element.

It is a feature of another embodiment of this invention that each output winding is inductively coupled to both flux paths of the magnetic element thereby presenting an output signal whenever either of these flux paths undergoes a reversal in its remanent magnetization.

It is a feature of still another embodiment of this invention that each output winding is inductively coupled to one flux path of the element in the vicinity of one aperture and also to one flux path in the vicinity of another aperture.

The foregoing and other objects and features of this invention will be more clearly understood from a consideration of the detailed description thereof which follows when taken in conjunction with the following drawing, in which.

Figure 3:
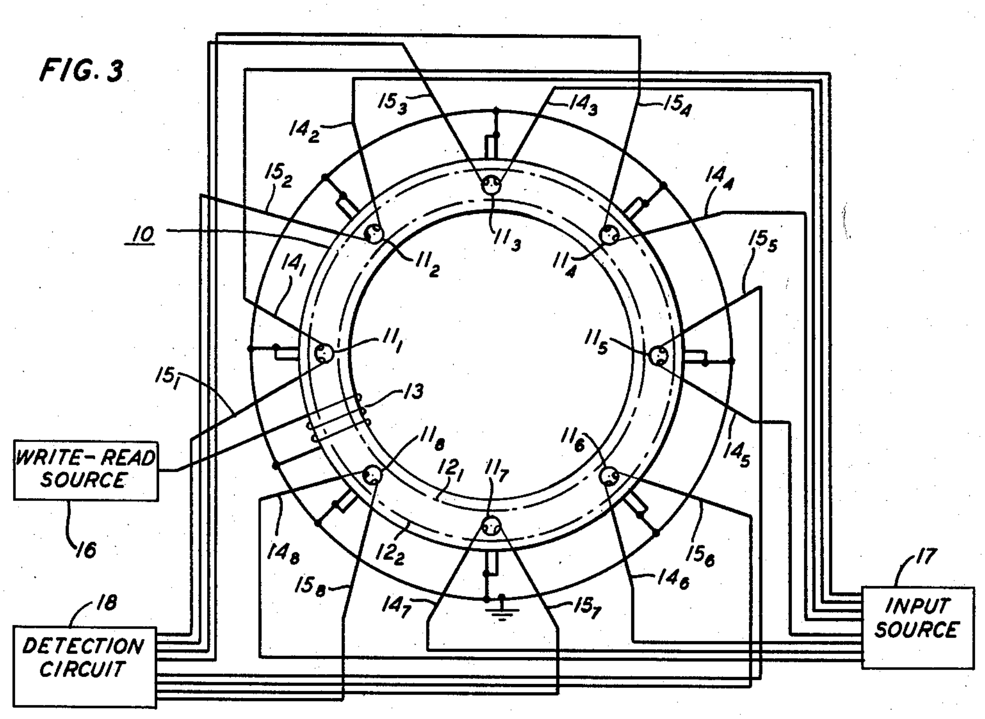
FIG. 3 depicts an illustrative single plane embodiment of a magnetic memory element according to the principles of this invention.

A specific embodiment of a memory circuit according to the principles of this invention is shown in FIG. 3. A toroidal core 10 is shown having eight apertures $11_1$ through $11_8$ therein which separate in the core 10 an inner annular flux path $12_1$ and an outer annular flux path $12_2$. The flux paths are of substantially equal minimum cross-sectional area and are represented in the drawing by dot-dash lines. The apertures $11_1$ through $11_8$ are shown having their axes parallel to the axis of the central aperture of the core 10; however, the axes of the apertures may be any angle to the axis of the central aperture since it is only necessary that they establish two substantially equal flux paths in the core 10. Moreover, the element 10 may be in a rectangular or other shape since the operation of this invention is not dependent upon its shape as a toroid. A word winding 13 is wound on the core 10 and is inductively coupled to both of the flux paths 12 and is connected between ground potential and a write-read pulse source 16. The source 16 is shown in block diagram form and may comprise any well-known circuit capable of providing pulses of a nature to be described hereinafter. Input windings $14_1$ through $14_8$ threading the apertures $11_1$ through $11_8$, respectively, are inductively coupled to flux path $12_2$ and are connected between ground potential and a source of input signals 17. Output windings $15_1$ through $15_8$ threading the apertures $11_1$ through $11_8$, respectively, are inductively coupled to flux path $12_2$ and are connected between ground potential and an output detection circuit 18. The input signal source 17 is shown in block diagram form and may comprise any well-known circuit capable of providing sequential or selective input signals of the nature described hereinafter simultaneously with the write signals from source 16. The detection circuit 18 is also shown in block diagram form and may comprise any circuit capable of detecting output signals induced on the windings 15. Bearing in mind the foregoing organization, a detailed description of the operation of this circuit will now be set forth.

Figure 1:
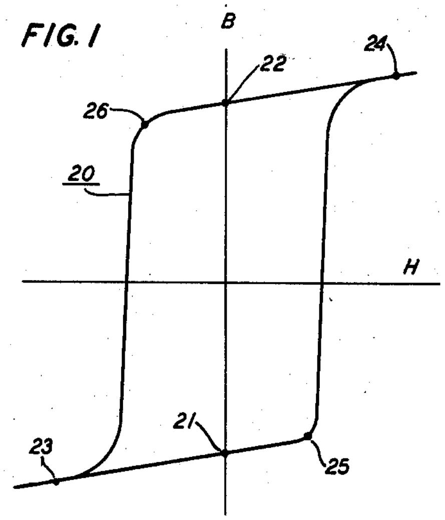
FIG. 1 depicts an idealized substantially rectangular hysteresis characteristic of the magnetic material which may be utilized in several embodiments of this invention.
Figure 4A:
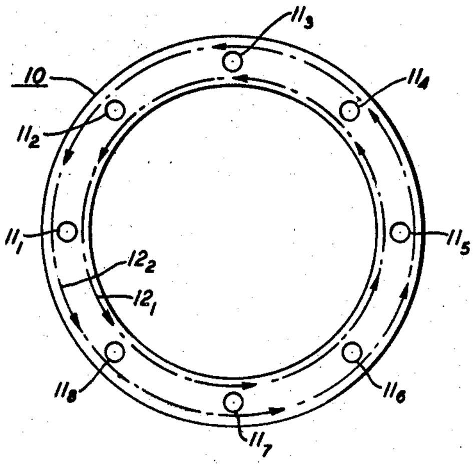
FIGS. 4A and 4B depict the magnetic memory element on FIG. 3 with the magnetic flux distribution symbolized therein at different stages of operation.

Following the application of a negative read-out pulse from source 16 during a preceding read-out operation, the remanent flux in the two flux paths $12_1$ and $12_2$ is in the same direction. This is shown in FIG. 4A where arrows on the dot-dash lines $12_1$ and $12_2$ representing the two flux paths manifest the direction of remanent magnetization in these flux paths. The condition of each flux path may also be demonstrated with reference to the flux loop of FIG. 1 and is determined thereon by the point 21. Information is subsequently written into the core 10 by the simultaneous application of write signals from the write-read source 16 to word winding 13 and from the source 17 to selected input windings 14. A write signal from source 16 is of a positive polarity and tends to reverse the remanent magnetization in both of the paths $12_1$ and $12_2$. The selectively applied write input signals from the source 17 are of a polarity dependent upon the particular binary values to be stored about the apertures. Thus a positive pulse from the write source 17 applied to the input winding $14_1$ threading the aperture $11_1$ produces a magnetomotive force on that part of path $12_2$ in the vicinity of aperture $11_1$ which aids the magnetomotive force produced by the write signal from the source 16 and drives this portion of path $12_2$ from remanent point 21 around the knee point 25 to the point of opposite saturation 24 of the loop 20 of FIG. 1. Upon the termination of the information input signal the portion of flux path $12_2$ near aperture $11_1$ will assume a remanent magnetization represented by the point 22 on loop 20. The remanent magnetization of path $12_2$ at the point 22 may be considered representative of the storage of a binary "1" in that portion of path $12_2$. A negative pulse from the write source 17 applied to the input winding $14_3$ threading the aperture $11_3$, however, produces a magnetomotive force on that part of path $12_2$ in the vicinity of aperture $11_3$ which opposes the magnetomotive force produced by the signal from source 16 and prevents this latter magnetomotive force from driving this portion of path $12_2$ beyond the knee point 25 of the loop 20 of FIG. 1. However, the magnetomotive force set up by the signal from source 16 does drive the magnetization in that portion of path $12_1$ in the vicinity of aperture $11_3$ from point 21 around the knee point 25 to the point of opposite saturation 24 of loop 20 and upon the termination of the signal this portion of path $12_1$ assumes the remanent magnetization represented by point 22 of loop 20. Consequently, as a result of the simultaneous application of the negative signal from the write source 17 and the positive signal from source 16, the remanent magnetization of that portion of path $12_2$ near aperture $11_3$ is unchanged while the remanent magnetization of that portion of path $12_1$ near aperture $11_3$ is reversed. This magnetic condition of the flux paths near aperture $11_3$ may be considered representative of the storage of a binary "0."

Figure 4B:
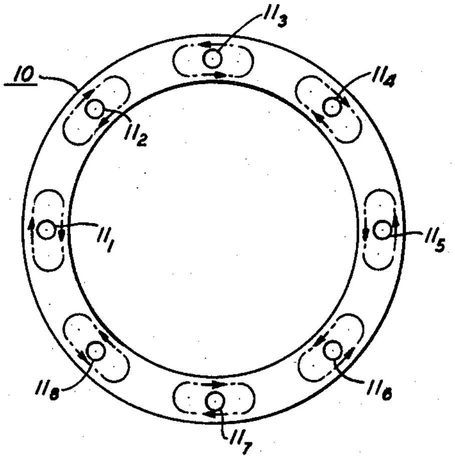

Flux reversals must occur throughout a closed path. Any flux reversal occurring in one of the flux paths 12 about one of the apertures 11 cannot complete itself through the other path 12 about that aperture since, as shown in FIG. 4A, after readout the direction of a flux reversal in either flux path would tend to drive the other path in the direction in which it is already remanently saturated. Flux reversals therefore occur around the central aperture of the core, rather than about the smaller apertures therein. Since a negative signal on an input winding 14 prevents a flux reversal in the path $12_2$ near an aperture 11 associated with that winding, only half of the flux in the core near that aperture can undergo a reversal and consequently only half of the entire flux pattern as shown in FIG. 4A can undergo a reversal. In the vicinity of apertures 11 whose input windings 14 have received a negative singal, there is essentially no flux change in path $12_2$ and a complete reversal in path $12_1$ caused by the positive signal on word winding 13. In the vicinity of apertures whose input windings 14 have received positive signals, which aid the magnetomotive force produced by the positive signal on word winding 13, an almost complete flux reversal occurs in path $12_2$ and there is little or no flux reversal in path $12_1$. Thus after information has been written into the core, one flux path in the vicinity of each aperture will have undergone a substantially complete flux reversal. FIG. 4B depicts an illustrative flux pattern in the core 10 after an illustrative information word has been written in. In the exemplary pattern shown, binary "1's" are stored about apertures $11_1$, $11_2$, $11_4$ and $11_7$ and binary "0's" are stored about apertures $11_3$, $11_5$, $11_6$ and $11_8$. The resulting direction of the flux pattern about each aperture is shown by arrows.

Readout of the information stored in the core is subsequently accomplished by the application of a negative read-out signal from the write-read source 16 to word winding 13. The read-out signal produces a magnetomotive force which re-establishes the flux pattern of FIG. 4A in the core. Signals are induced in those ones of the output windings 15 associated with those of the apertures 11 whose flux patterns had stored binary "1's". The output detection circuit 18 responds to the output signals induced in the coils 15 in a conventional manner and reading out of information from the core 10 is thus completed and the core 10 is now in a magnetic state preparatory to the writing of another information word therein.

Figure 5:
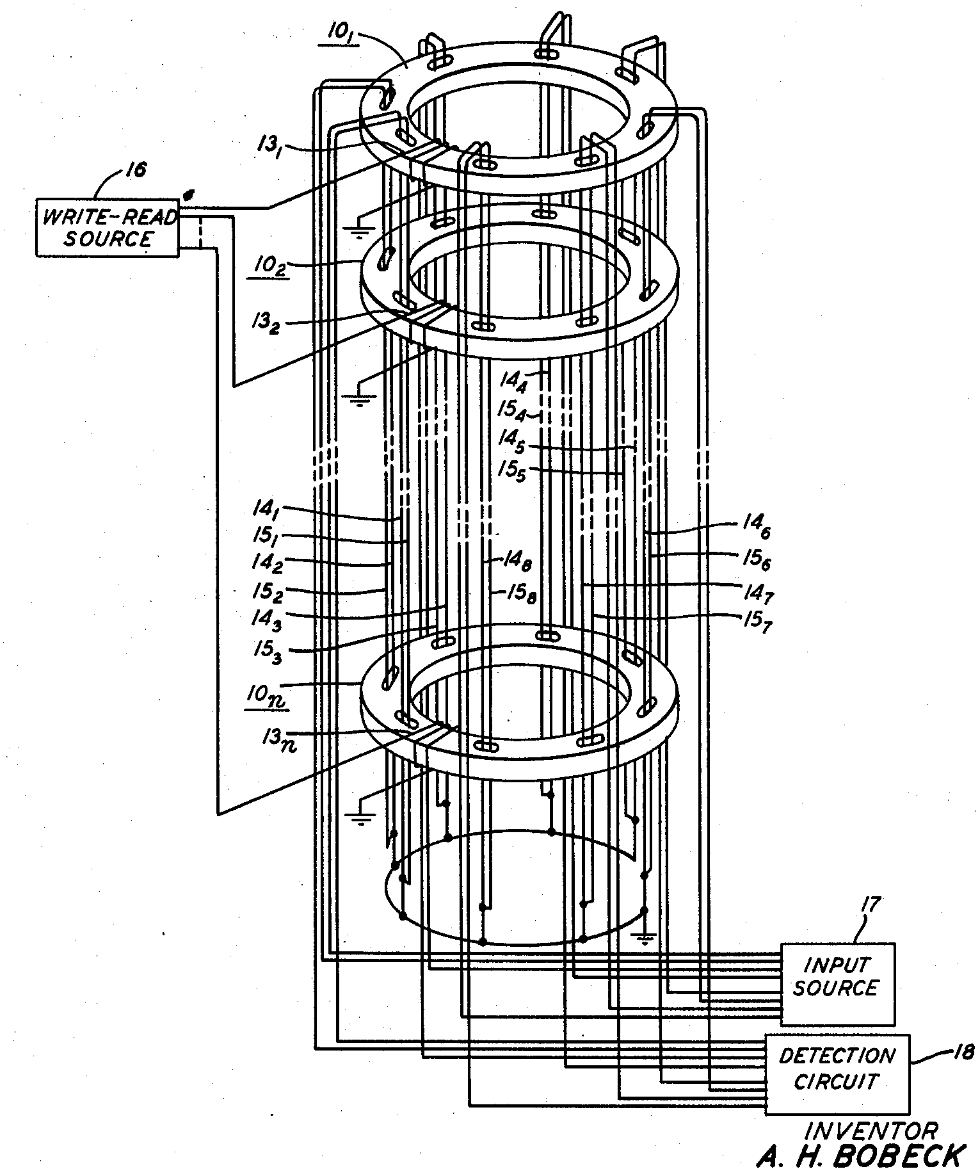
FIG. 5 depicts an illustrative multiplane memory array according to the principles of this invention.

FIG. 5 depicts a plurality of the cores 10 of FIG. 3 stacked together to form a multiplane word-organized memory array. FIG. 5 shows cores $10_1$, $10_2$, . . . $10_n$, each of which is identical to the core 10 previously described. The input windings $14_1$ through $14_8$ and the output windings $15_1$ through $15_8$ thread corresponding apertures of the several cores and are connected between ground potential and an input source 17 and between ground potential and detection circuit 18, respectively. Each of the input and output windings is inductively coupled to the outer flux path $12_2$ of each of the cores in the vicinity of the apertures it threads. This inductive coupling is indicated by showing the windings threading the corresponding apertures of the cores in one direction and returning just outside the circumference of the cores near the same apertures.

The operation of the multiplane array of FIG. 5 is similar to that of the single core arrangement of FIG. 3 previously described. Following the application of negative read-out pulses from write-read source 16 each of the cores $10_1$ through $10_n$ is in the magnetic condition represented by the flux pattern of FIG. 4A. Information is written into a particular one of the cores, for example the core $10_2$, by the simultaneous application of a positive signal from write-read source 16 to winding $13_2$ and of selective positive and negative signals from the source 17 to the input windings 14. The signals from the source 17 applied to the input windings 14 must be of a magnitude insufficient to drive the flux in the paths $12_2$ past the knee points 25 and 26 of the loop 20 of FIG. 1; otherwise the signals on these coils would interfere with the magnetic condition of unselected cores. Information is selectively written into the cores $10_1$ through $10_n$ in a manner identical to that described for the core 10 of the single plane arrangement of FIG. 3. A complete binary word may thus be stored in each core of the array. Readout is accomplished a word at a time by the application of negative read-out signals from the write-read source 16 to the windings 13. As each core is interrogated, signals are induced in those particular ones of the output windings 15 associated with apertures of the interrogated core whose flux patterns had stored binary "1's." The output detection circuit 18 responds to the output signals induced in the windings 15 as each core is interrogated and completes the readout of information from the array.

Figure 6:
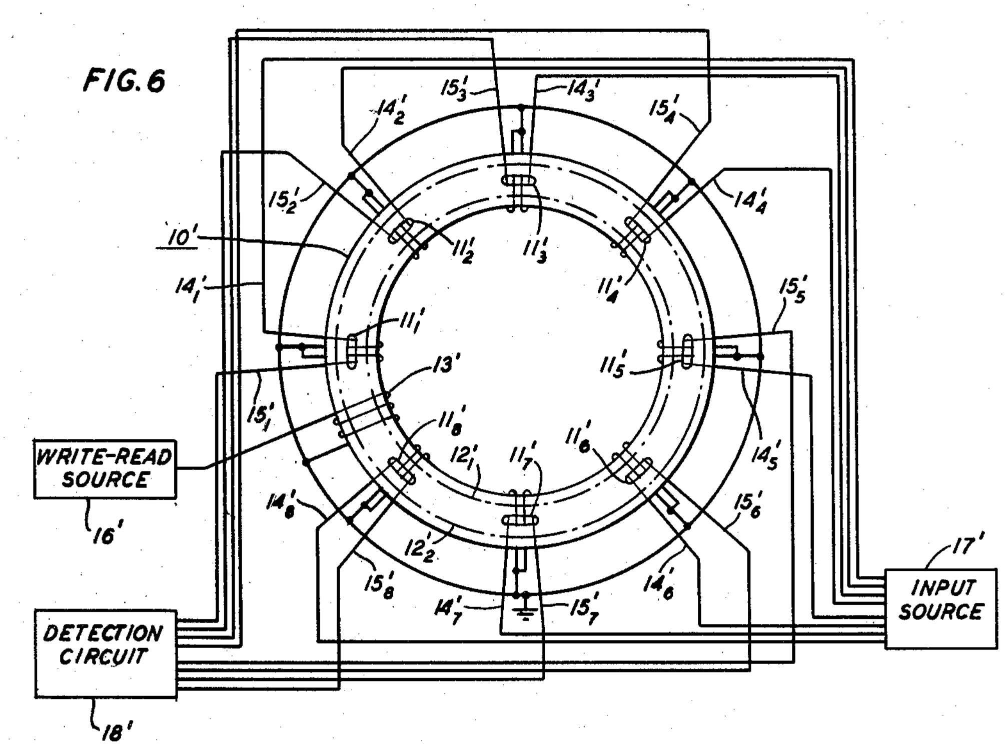
FIG. 6 depicts another single plane illustrative embodiment of a magnetic memory element according to the principles of this invention.

FIG. 6 depicts another specific illustrative embodiment of a memory circuit according to the principles of this invention. The structure and operation of this embodiment are very similar to that described in connection with the embodiment shown in FIG. 3. Thus a toroidal core 10′ is shown having eight apertures therein $11_1'$ through $11_8'$, which separate two distinct flux paths $12_1'$ and $12_2'$ in the core. These flux paths have substantially equal cross-sectional areas and are depicted in FIG. 6 by dot-dash lines. A word winding 13′ is inductively coupled to both flux paths 12′ in the same direction and is connected between ground potential and a write-read pulse source 16′. Input windings $14_1'$ through $14_8'$ threading the apertures $11_1'$ through $11_8'$, respectively, are inductively coupled to flux path $12_1'$ in one direction and to flux path $12_2'$ in the other direction, and are connected between ground potential and a source of write input signals 17′. Output windings $15_1'$ through $15_8'$ also threading apertures $11_1'$ through $11_8'$, respectively, are inductively coupled to flux path $12_1'$ in one direction and to flux path $12_2'$ in the other direction and are connected between ground potential and output detection circuit 18′. The write-read source 16′ and write source 17′ are shown in block diagram form only and may comprise well-known circuits capable of providing pulses of the character to be described hereinafter. The detection circuit 18′ is also shown in block diagram form and may also comprise well-known circuits capable of detecting signals of either polarity induced on the output windings 15′.

Information is written into and read out from the core 10′ in a manner very similar to that described for the core 10 of FIG. 3. Thus, after the application of a negative read-out pulse from write-read source 16′, the remanent flux in the paths $12_1'$ and $12_2'$ are as shown in FIG. 4A. Information is subsequently written into the core 10′ by the simultaneous application of signals from source 16′ to word winding 13′ and selectively from input write source 17′ to input windings 14′. The signal from source 16′ is at this time of a positive polarity, while the signals from the source 17′ are of a polarity dependent upon the particular binary values to be stored in the core. The signal from source 16′ tends to reverse the remanent magnetization in both of the paths $12_1'$ and $12_2'$, while the positive or negative pulse applied to each of the windings 14′ tends to aid the signal from source 16′ in reversing the magnetization in one path but to oppose the tendency of that signal to reverse the magnetization in the other path. Thus, upon the termination of the input signals, either one, but only one, of the flux paths in the vicinity of each aperture will have undergone a reversal of its remanent magnetization. The particular flux path to reverse is then determinative of the particular binary value stored by the flux pattern about a particular aperture. FIG. 4B also depicts an illustrative flux pattern in core 10' of the embodiment of FIG. 6 after information has been written in. Read-out is accomplished by the subsequent application of a negative read-out pulse from the source 16' to winding 13' which re-establishes in the core the flux pattern depicted by FIG. 4A. Since output windings 15' are inductively coupled to one flux path in one direction and to the other flux path in the other direction, a flux reversal in one path induces an output signal of one polarity in an output winding, while a flux reversal in the other path induces an output signal of the other polarity. Therefore, an output signal is induced in each of the output windings 15' during the read-out operation, with the polarity of the output signal determining the binary value stored in the flux pattern about a particular aperture. The detection circuit 18' detects the positive or negative output signals and completes the reading out of information from the core.

Figure 2:
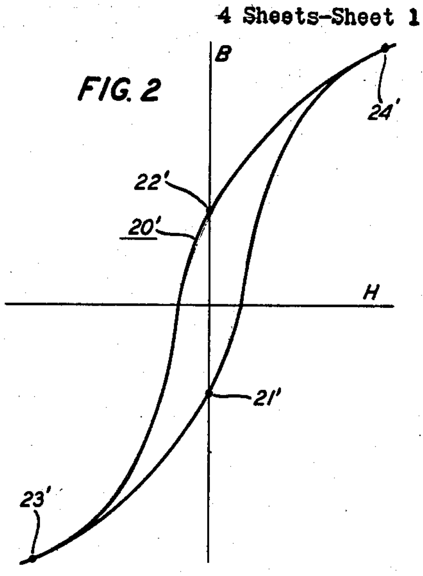
FIG. 2 depicts a less rectangular hysteresis characteristic of the magnetic material which may be utilized in several embodiments of this invention.

In the circuit of FIG. 6 the binary values are characterized by output signals of two polarities, rather than by a signal of one polarity and the absence of a signal. Therefore, positive discrimination between outputs representative of the two binary values is advantageously achieved for the circuit of FIG. 6. Moreover, the core material of the circuit of FIG. 6 need not have a substantially rectangular hysteresis characteristic, it being sufficient that it have the ability to assume stable remanent states. Thus a hysteresis loop 20' depicted in FIG. 2, for example, would prove satisfactory for the core material of the circuit of FIG. 6. After information has been written into the core 10', the flux in one flux path near a particular aperture would be represented by the point 21', while that of the other path near this aperture would be represented by the point 22'. The application of the negative read-out pulse from source 16' to winding 13' then drives the flux in both paths to the saturation point 23' and, upon the termination of the read-out signal, both paths assume the remanent magnetic condition represented by the point 21'. The shuttle induced in an output winding 15' by the driving of one path from point 21' to point 23' merely diminishes somewhat the opposite polarity output signal induced in the winding by the driving of the other path from point 22' to point 23'. Therefore, the relatively large shuttle signal resulting from the use of core material whose hysteresis characteristics are not substantially rectangular does not unduly interfere with the reading out of information from the core 10'.

An array similar to that of FIG. 5 can also be realized in which the stored binary values are characterized by bipolar output signals representative of the two binary values. To accomplish this the output windings threading corresponding apertures of the cores may be inductively coupled in one direction to the outer flux path of each core near a particular aperture and inductively coupled in the other direction to the inner flux path of each core near that aperture. This could be accomplished, for example, by passing an output winding just outside the outer circumference of the cores near corresponding apertures of the cores, threading the winding through these apertures, passing it just outside the inner circumference of the cores near these apertures, and again threading these eapertures. Such an array would advantageously use core material having substantially square loop hysteresis characteristics, however, to prevent signals applied to the input windings from having adverse effects upon the magnetic condition of unselected cores.

Figure 7:
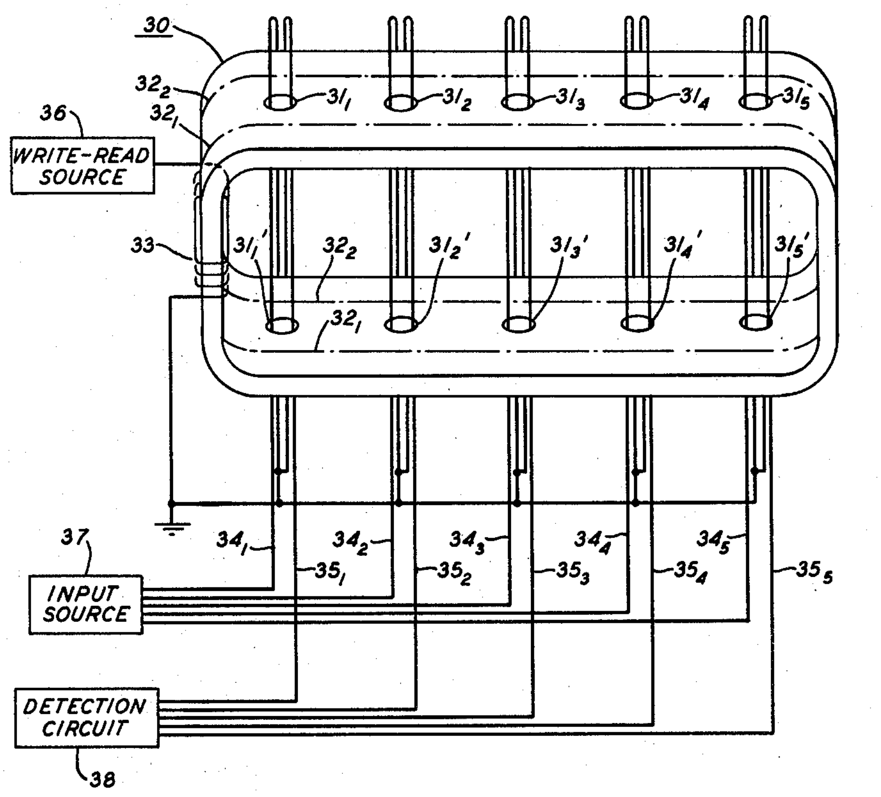
FIG. 7 depicts yet another illustrative embodiment of a magnetic memory element according to the principles of this invention.

Another embodiment according to the principles of this invention is shown in FIG. 7. The magnetic element 30 advantageously comprises a closed loop of magnetic tape having apertures $31_1$ through $31_5$ and $31_1'$ through $31_5'$ therein which separate two flux paths $32_1$ and $32_2$ in the element. The flux paths 32 are again represented in the drawing by dot-dash lines. A word winding 33 is inductively coupled to both of the flux paths 32 and is connected between ground potential and a write-read pulse source 36. Input windings $34_1$ through $34_5$ thread the apertures $31_1$ and $31_1'$, $32_2$ and $32_2'$, et cetera, respectively, and are connected between ground potential and a source of write input signals 37. Output windings $35_1$ through $35_5$ thread the apertures $31_1$ and $31'_1$, $32_2$ and $32_2'$, et cetera, respectively, and are connected between ground potential and output detection circuit 38. The apertures $31_1$ through $31_5$ and $31_1'$ through $31_5'$ are located in corresponding positions on opposite sides of the closed loop of magnetic tape 30. Each of the input windings 34 and output windings 35 is inductively coupled to the flux path $32_2$ on both sides of the element 30 near corresponding apertures. Thus each of the windings 34 and 35 is shown passing just outside the two sides of the element near path $32_2$ and then threading corresponding ones of the apertures. The sources 36 and 37 are shown in block diagram form only and may comprise well-known circuits capable of providing pulses of the character described hereinafter. The detection circuit 38 is also shown in block diagram form and may comprise well-known circuits capable of responding to signals of either polarity induced in the output windings 35.

Following a negative read-out pulse applied to coil 33 from write-read source 36, both flux path $32_1$ and $32_2$ will be remanently magnetized in the same direction; this remanent magnetization is in a counter-clockwise direction as viewed in FIG. 7. Information is subsequently written into the tape by the simultaneous application of a positive write pulse to winding 33 from write-read source 36 and both positive and negative pulses to the windings 34 from the write source 37 in accordance with the information bits to be stored. The pulse on winding 33 tends to reverse the magnetization in both flux paths, while the write pulses on each of the windings 34 tends to aid in the reversal of magnetization in path $32_2$ on one side of the element 30 but to oppose the reversal of magnetization in path $32_2$ on the other side of element 30. After information has been written into the circuit, that portion of flux path $32_2$ in the vicinity of either one, but only one, of each pair of corresponding apertures 31 will have undergone a reversal of its remanent magnetization. The binary value stored in the flux patterns about each pair of apertures then depends upon which aperture is adjacent that portion of path $32_2$ which has undergone a magnetization reversal. Readout is accomplished by the application of a negative read-out pulse to winding 33 from write-read source 36 to re-establish counter-clockwise magnetizations in both of the flux paths 32. The portion of flux path $32_2$ adjacent to one of the apertures of each pair of corresponding apertures 31 undergoes a reversal of magnetization which induces signals in output windings 35. The polarity of the signal induced in each winding 35 is dependent upon the binary value stored about the pair of apertures associated with that winding. The detection circuit 38 responds to the output signals induced in windings 35 thereby completing the read-out operation. Thus the embodiment of this invention shown in FIG. 7 also produces output signals the polarity of which are characteristic of the binary values stored, thereby advantageously achieving better discrimination between the output signals representative of the two binary values. Just as in the embodiment shown in FIG. 6 and described hereinbefore, relatively large shuttle signals will advantageously not unduly interfere with the read-out operation, and it is therefore not essential that the magnetic tape comprising the element 30 have a substantially square hysteresis loop, it being only necessary that it be able to assume stable remanent states.

It is to be understood that the specific embodiments of this invention described herein are merely illustrative and that numerous other arrangements according to the principles of the invention may be devised by one skilled in the art without departing from the spirit and scope of the invention.

What is claimed is:

1. A magnetic memory circuit comprising a closed magnetic element capable of assuming stable remanent states having a plurality of apertures therein defining two distinct flux paths in said element, each of said apertures having an input winding and an output winding threaded therethrough, a drive winding inductively coupled to magnetic material defining both of said flux paths, means for concurrently applying a current pulse of a first polarity to said drive winding and current pulses of predetermined polarities to said input windings to cause partial flux reversals about each of said apertures, said flux reversals about each aperture occurring in only one of said flux paths representative of binary information values, and means for applying a read-out current pulse of a second polarity to said drive winding to restore the flux about each of said apertures to a predetermined state thereby inducing signals in said output windings indicative of information values stored in said element.

2. A magnetic memory circuit comprising a closed magnetic element capable of assuming stable remanent states, said element having a central aperture and a plurality of other apertures therein defining two distinct flux paths in said element, each of said other apertures having an input winding threaded therethrough, a drive winding inductively coupled to magnetic material defining both of said flux paths, means for concurrently applying a current pulse of a first polarity to said drive winding and current pulses of predetermined polarities to said input windings to cause partial flux reversals about each of said other apertures, said flux reversals about each aperture occurring in only one of said flux paths representative of binary information values, means for applying a read-out current pulse of a second polarity to said first winding and means for detecting flux reversals caused by said read-out pulse indicative of information values stored in said element.

3. A magnetic memory circuit according to claim 2 in which said other apertures have their axes parallel to the axis of said central aperture thereby defining said distinct flux paths as inner and outer annular flux paths.

4. A magnetic memory circuit according to claim 2 in which said flux paths have substantially equal cross sectional areas.

5. A magnetic memory circuit according to claim 2 in which said input windings are inductively coupled to magnetic material defining only one of said flux paths.

6. A magnetic memory circuit according to claim 3 in which said input windings are inductively coupled to magnetic material defining only the outer one of said flux paths.

7. A magnetic memory circuit according to claim 6 in which said means for detecting flux reversals comprises output windings threading said other apertures.

8. A magnetic memory circuit according to claim 7 in which said output windings are inductively coupled to magnetic material defining only the outer one of said flux paths.

9. A memory matrix comprising a plurality of closed magnetic elements, each of said elements being capable of assuming stable remanent states, each of said elements having a central aperture and a plurality of other apertures therein defining two distinct flux paths of substantially equal cross-sectional area, said elements being disposed in columnar fashion with the other apertures of each of said elements being arranged on a plurality of common axes, each element having a drive winding inductively coupled to magnetic material defining both flux paths, a plurality of input windings each threading the other apertures arranged on a common axis, means for concurrently applying a current pulse of a first polarity to a selected one of said drive windings and current pulses of predetermined polarities to said input windings to cause partial flux reversals about each of said other apertures of the element coupled by said selected drive winding, said flux reversals about each aperture occurring in only one of said flux paths, means for applying a read-out current pulse of a second polarity to said selected drive winding, and means for detecting flux reversals caused by said read-out pulse indicative of binary information values stored in that element coupled by said selected drive winding.

10. A memory matrix according to claim 9 in which the central aperture of each element is arranged on a common axis parallel to the common axes of said other apertures.

11. A memory matrix according to claim 9 in which each of said input windings is inductively coupled to magnetic material defining only one of said flux paths in each of said elements.

12. A memory matrix according to claim 9 in which said means for detecting flux reversals comprises a plurality of output windings, each of said output windings threading respectively each of the other apertures arranged on said common axes.

13. A memory matrix according to claim 12 in which each of said output windings is inductively coupled to magnetic material defining only one of said flux paths in each of said elements.

14. A magnetic memory circuit comprising a closed magnetic element capable of assuming stable remanent states having a plurality of apertures therein defining two distinct paths in said element, a first winding inductively coupled to magnetic material defining both of said flux paths, each of said apertures having a second winding threaded therethrough, each of said second windings being inductively coupled to material defining one of said flux paths in the same sense that said first winding is coupled to said material defining that flux path and coupled to material defining the other of said flux paths in a sense opposite from the coupling of said first winding to said material defining that path, means including said first winding for causing partial flux reversals about each aperture, said flux reversals about each aperture occurring in only one of said flux paths, the particular flux path experiencing a flux reversal being determinative of a particular binary information value stored about a particular aperture, means for applying a read-out current pulse to said first winding, and means for detecting signals induced in said second windings responsive to said read-out pulse indicative of information values stored in said element.

15. A magnetic memory circuit comprising a closed magnetic element having a plurality of apertures therein defining two distinct flux paths in said element, a drive winding inductively coupled in the same sense to magnetic material defining both of said flux paths, each of said apertures having an input winding and an output winding threaded therethrough, each of said output windings being inductively coupled in one sense to material defining one of said flux paths and inductively coupled in the opposite sense to material defining the other of said flux paths, means for concurrently applying a current pulse of a first polarity to said drive winding and current pulses of predetermined polarities to said input windings to cause partial flux reversals about each of said apertures, said flux reversals about each aperture occurring in only one of said flux paths representative of binary information values, means for applying a read-out current pulse of a second polarity to said drive winding, and means for detecting signals induced in said output windings responsive to said read-out pulse indicative of information values stored in said element.

16. A magnetic memory circuit according to claim 15 in which said element has a central aperture therein having its axis parallel to the axes of said plurality of apertures.

17. A magnetic memory circuit according to claim 16 in which each of said input windings is inductively coupled in one sense to material defining one of said flux paths and inductively coupled in the opposite sense to material defining the other of said flux paths.

18. A magnetic memory circuit comprising a closed magnetic element having a plurality of apertures therein defining two distinct flux paths in said element, a drive winding inductively coupled to magnetic material defining both of said flux paths, each of a plurality of input windings threading two of said apertures, means for concurrently applying a current pulse of a first polarity to said drive winding and current pulses of predetermined polarities to said input windings to cause partial flux reversals about each of said apertures, said flux, reversals about each aperture occurring in only one of said flux paths, means for applying a read-out current pulse of a second polarity to said drive winding, and means for detecting flux reversals caused by said read-out pulse indicative of informative values stored in said element.

19. A magnetic memory circuit according to claim 18 in which each of said input windings threading two of said apertures is inductively coupled in one sense to material defining one of said flux paths near one of said two apertures and is inductively coupled in the opposite sense to material defining the same flux path near the other of said two apertures.

20. A magnetic memory circuit according to claim 19 in which said element comprises a closed loop of magnetic tape.

21. A magnetic memory circuit according to claim 18 in which said means for detecting flux reversals comprises a plurality of output windings, each one of said output windings also threading a pair of said apertures threaded by one of said input windings, and each of said output windings iductively coupled in one sense to material defining one of said flux paths near one aperture of said pair and inductively coupled in the opposite sense to material defining the same flux path near the other aperture of said pair.

22. A memory device comprising a toroidal magnetic element of a material being capable of assuming stable remanent magnetic states, said element having a plurality of apertures therein arranged to divide said element in a first and a second annular flux path, a word drive winding coupled to said element and linking magnetic material defining both said first and said second flux path, means for applying a read pulse to said drive winding to induce a normal magnetic flux in the same direction in said first and second flux path at each of said apertures, a plurality of bit input windings threading respectively said plurality of apertures and coupled to material defining said first flux path, means for applying one write pulse to said drive winding, means for selectively applying other write pulses of one and the other polarity to said input windings coincidently with said one write pulse to cause flux reversals in said first or said second flux path at said apertures representative of binary information bits, and a plurality of output windings threading respectively said plurality of apertures energized responsive to flux reversals caused by said read pulse for generating output signals indicative of binary information bits stored in said magnetic device.

References Cited in the file of this patent

UNITED STATES PATENTS

| | | |
|---|---|---|
| 2,810,901 | Crane | Oct. 22, 1957 |
| 2,962,215 | Haynes | Nov. 29, 1960 |

OTHER REFERENCES

Publication I: Proceedings of the IRE, March 1956, pp. 321–332.

Publication II: Proceedings of the IRE, January 1959, pp. 63–73.